Patented Jan. 15, 1924.

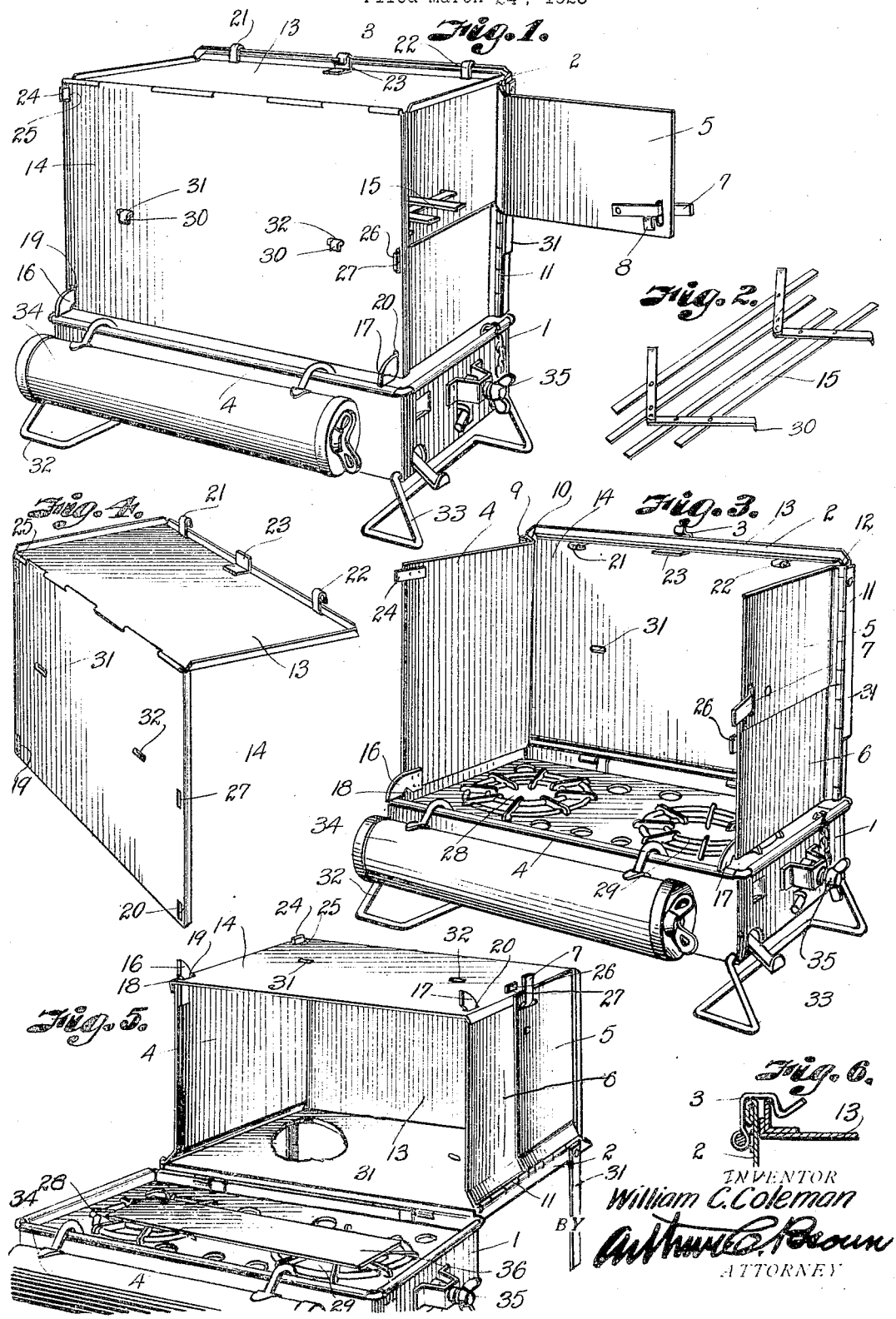

1,480,598

UNITED STATES PATENT OFFICE.

WILLIAM C. COLEMAN, OF WICHITA, KANSAS.

OVEN.

Application filed March 24, 1923. Serial No. 627,329.

*To all whom it may concern:*

Be it known that I, WILLIAM C. COLEMAN, a citizen of the United States, residing at Wichita, in the county of Sedgwick and State of Kansas, have invented certain new and useful Improvements in Ovens; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to stoves and particularly to collapsible or knock-down ovens therefor.

The invention particularly relates to camp stoves, the purpose being to provide a camp stove with a collapsible oven so that the same can be folded in a collapsed state to permit it to be readily compacted with the case of the stove for the purpose of transportation, the parts of the oven being easily set up so that an efficient oven will be provided.

The oven can be tilted over on its side out of the way of the burners and part of the oven can be removed so as to provide a wind shield for the burners, this being an important feature for outdoor cooking.

The parts of the oven are so arranged that the top, sides and ends can be readily brought into functional position and a grate may be removably supported for the purpose of baking.

If the oven is in one position, it will be a baking oven; if it is thrown over on its side, it will be a warming oven, and if the top and one side are removed, the oven parts will form a shield or wind break.

The novel construction of the invention will be clearly understood by reference to the following description in connection with the accompanying drawings, in which—

Fig. 1 is a perspective view of a complete stove and oven constructed in accordance with my invention.

Fig. 2 is a detail view of the oven grate.

Fig. 3 is a perspective view of the stove showing part of the oven removed, the remaining part forming a wind break.

Fig. 4 is a perspective view of the removed part.

Fig. 5 is a perspective view of the stove with the grate thrown over on its side to constitute a warming oven, and Fig. 6 is a sectional view of one vertical side wall and the top, showing a latch for securing them together.

Referring now to the drawings by numerals of reference:

1 designates the bottom or case to which is hinged a lid 2 having a latch 3 to engage the top edge of a complementary member which goes to make up the oven. The latch 3 on the cover 2 is adapted to engage the flange 4 of the case 1 so as to fasten the cover in place to hold the contents of the case for transportation. The cover 2 carries hinged end members 4 on one end and 5 and 6 on the other. The member 5 is a door member and it carries a pivoted latch bar 7 with an offset latch portion 8, which is adapted to be moved in overlapping relation to the end member 6 so that the door 5 and end member 6 will be fastened together. The raising of the free ends of the lever 7, however, will withdraw the tongue or latch 8 so that the member 5 can be swung on its hinge.

The hinge 9 for the member 4 is offset from the member 2 so that a groove or slot 10 is provided and the hinge 11 which secures the door 5 and the end member 6 is also offset to provide a groove 12. The groove 12 receives the top member 13 and side member 14 when the oven is collapsed.

Between the member 14 and the cover 2 may be received a collapsible grate 15. The members 4 and 6 have outstanding lugs 16 and 17 which are provided with notches as at 18 on the lug 16. The lugs 16 and 17 pass through slots 19 and 20 in the member 14 to hold the member 14 against the edges of the members 4, 5 and 6 and to the top edge of the member 14 is hinged a top member 13, which has hooks 21 and 22 to engage the edge of the member 2. The latch 3 in turn engages the angle 23 to hold the parts together.

The member 14 is additionally braced with relation to the member 4 by a blade or lug 24 passing through an opening 25 and it is braced with respect to the member 6 by a lug 26, which passes through an opening 27 in the member 14.

When the oven is set up, as shown in Fig. 1, a strip of sheet metal may rest upon the burners 28 and 29 so that the flame will be spread toward the side of the oven to tend to heat the corners thereof and so that the plate can become heated to distribute the heat evenly by radiation throughout the oven.

The grate 15 has depending fingers 30 which engage openings 31 and 32 in the sides of the oven so that the grate will be supported and so that the side members 2 and 14 will be tied together.

When the parts are assembled as shown in Fig. 1, the door 5 may be opened to introduce the food to be baked it being understood that when the oven is in use, the bottom will really be the effective part of the oven.

If it is desired to use the burners 28 and 29 for cooking purposes, the oven can be tilted over as shown in Fig. 5 and supported upon the legs 31. Then it will constitute a warming oven. The device can be partially set up as shown in Fig. 3 by removing the members 13 and 14, leaving the side wall 2 and the end walls 4 and 6 with the end wall 5 fastened to 6; then the stove can be used as an ordinary oil stove, the walls 2, 4, 5 and 6 constituting a wind break. The stove body may be supported on swinging legs 32 and 33.

Of course, in so far as this invention is concerned, the burners may be supplied from any suitable source but for convenience I have shown a supply tank 34, which communicates with the burners through a pipe adapted to be controlled through the medium of a valve-governing device 35.

When the stove is to be knocked down or collapsed for transportation, the members 13 and 14 will be removed, the grate will be taken out and the deflecting plate 36, which consists of a strip of metal laid over the burners to deflect the heat, will be removed; the member 13 will be swung down upon the member 14, the grate and plate will be assembled with the members 13 and 14, and these may then slide in the grooves 10 and 12. The members 4, 5 and 6 will then be folded over on them.

The member 2 can be swung down rearwardly away from the case 1. Then the stove can function as an ordinary camp stove. The method of setting up the oven has already been explained so it will be readily understood that the oven can be brought into use very quickly. It can be used for either a baking oven or a warming oven and it may also be utilized as a wind break. Such a device permits the stove to be assembled in a compact, easily portable manner, but the construction of that part of my invention which relates strictly to portability is described in another application so I do not make any particular claim for it in this application.

What I claim and desire to secure by Letters-Patent is:

1. A stove comprising a burner-carrying case, a vertical side wall hinged to said case, end walls hinged to said side wall but offset with respect thereto to provide receiving grooves, the end walls having swinging movement toward and away from the side wall, and a combined top and side wall structure co-operating with the first side wall member and the end walls to form an oven, the combined top and side wall structure being receivable in the grooves when the oven is collapsed.

2. A stove comprising a burner-carrying case, a vertical side wall hinged to said case, end walls hinged to said side wall but offset with respect thereto to provide receiving grooves, the end walls having swinging movement toward and away from the side wall, a combined top and side wall structure co-operating with the first side wall member and the end walls to form an oven, the side walls being slotted, the combined top and side wall structure being receivable in the grooves when the oven is collapsed, and a grate having means for engagement with the slots in the side wall members whereby the grate will be supported above the bottom of the oven.

3. In a stove, a cover hinged to the stove, end wall members hinged to the ends of the cover, a removable side wall and a removable top member hinged together, and means for fastening the removable side wall member and top member to the cover and to the end wall members to provide an oven.

4. In a stove, a cover hinged to the stove, end wall members hinged to the ends of the cover, a removable side wall and a removable top member hinged together, means for fastening the removable side wall member and top member to the cover and to the end wall members to provide an oven, the oven being adapted to be tilted over on its side, and legs for supporting the oven when it is tilted on its side.

5. In a stove, a cover hinged to the stove, end wall members hinged to the ends of the cover, a removable side wall and a removable top member hinged together, and means for fastening the removable side wall member and top member to the cover and to the end wall members to provide an oven, the removable top and side members forming an oven when in place and the cover and end member forming a wind break when the top member and side member are removed.

6. In a stove, a casing, a cover hinged to the casing and movable to vertical position to form a side member, end members hinged to the side member and swinging outwardly to substantially parallel positions, one of the end members being of less height than the other end member, a door normally in line with the short end member, the combined height of the door and short end member being substantially equal to that of the other end member, and a combined top and side structure removably secured to the cover and end members.

In testimony whereof I affix my signature.

WILLIAM C. COLEMAN.